(12) United States Patent
Cargonja et al.

(10) Patent No.: US 7,570,176 B2
(45) Date of Patent: Aug. 4, 2009

(54) RADIO FREQUENCY IDENTIFICATION TAG AND A METHOD OF OPERATING SAME

(75) Inventors: Nikola Cargonja, San Carlos, CA (US); Joseph S. Chan, Los Gatos, CA (US); Don H. Ahn, Sunnyvale, CA (US)

(73) Assignee: Savi Technology, Inc., Mountain View, CA (US)

( * ) Notice: Subject to any disclaimer, the term of this patent is extended or adjusted under 35 U.S.C. 154(b) by 529 days.

(21) Appl. No.: 11/329,415

(22) Filed: Jan. 10, 2006

(65) Prior Publication Data

US 2007/0159360 A1   Jul. 12, 2007

(51) Int. Cl.
G08G 1/09 (2006.01)

(52) U.S. Cl. ............... 340/905; 340/505; 340/10.1; 340/572.1; 340/825.49; 340/10.4; 340/10.5; 340/825.36; 700/229; 342/450; 235/384

(58) Field of Classification Search ... 340/572.1–572.9, 340/539.13, 539.23, 993, 988, 10.5, 825.36, 340/825.49, 10.1, 10.4; 342/385, 357.07, 342/457, 450; 700/229; 235/384
See application file for complete search history.

(56) References Cited

U.S. PATENT DOCUMENTS

| | | | |
|---|---|---|---|
| 4,217,588 A | | 8/1980 | Freeny, Jr. |
| 5,490,079 A | * | 2/1996 | Sharpe et al. ............ 705/418 |
| 5,631,642 A | | 5/1997 | Brockelsby et al. |
| 5,790,946 A | * | 8/1998 | Rotzoll .................... 455/343.1 |
| 5,887,842 A | | 3/1999 | Granger |
| 5,977,913 A | | 11/1999 | Christ |
| 6,208,235 B1 | * | 3/2001 | Trontelj ..................... 340/10.1 |
| 6,496,112 B1 | * | 12/2002 | Vega ......................... 340/572.1 |
| 6,542,114 B1 | * | 4/2003 | Eagleson et al. ........ 342/357.07 |
| 6,720,888 B2 | | 4/2004 | Eagleson et al. |
| 6,726,099 B2 | * | 4/2004 | Becker et al. ................ 235/380 |
| 6,765,484 B2 | | 7/2004 | Eagleson et al. |
| 6,940,392 B2 | | 9/2005 | Chan et al. |
| 6,958,677 B1 | * | 10/2005 | Carter ....................... 340/10.1 |
| 7,024,331 B2 | | 4/2006 | Jones et al. |
| 7,187,278 B2 | | 3/2007 | Biffar |
| 2003/0013146 A1 | | 1/2003 | Werb |

(Continued)

OTHER PUBLICATIONS

Office Action mailed Nov. 27, 2007 in U.S. Appl. No. 11/329,379, filed Jan. 10, 2006.

(Continued)

*Primary Examiner*—Davetta W Goins
*Assistant Examiner*—Hoi C Lau
(74) *Attorney, Agent, or Firm*—Haynes and Boone LLP (57) ABSTRACT

A tag can transmit a tag signal, and responds to receipt of a wireless signpost signal by determining whether the signpost that generated the signal is currently active. When the signpost is respectively determined to be active and inactive, the tag respectively includes and excludes from the tag signal an information portion that relates to the signpost that generated the received signpost signal. In another configuration, a tag has first and second antennas, receives wireless signpost signals through at least one of the antennas, and responds to receipt of a signpost signal containing antenna select information by causing a selected one of the first and second antennas to be disabled and the other of the first and second antennas to receive wireless signpost signals.

25 Claims, 6 Drawing Sheets

U.S. PATENT DOCUMENTS

| | | |
|---|---|---|
| 2003/0030568 A1* | 2/2003 | Lastinger et al. ....... 340/825.49 |
| 2003/0104848 A1* | 6/2003 | Brideglall ................... 455/574 |
| 2004/0263319 A1* | 12/2004 | Huomo ...................... 340/10.2 |
| 2005/0035862 A1 | 2/2005 | Wildman et al. |
| 2005/0093679 A1* | 5/2005 | Zai et al. ................... 340/10.2 |
| 2006/0109109 A1* | 5/2006 | Rajapakse et al. ...... 340/539.13 |
| 2006/0261951 A1 | 11/2006 | Koerner et al. |
| 2007/0159357 A1 | 7/2007 | Cargonja et al. |
| 2007/0159358 A1* | 7/2007 | Cargonja et al. ............ 340/988 |
| 2007/0159359 A1* | 7/2007 | Cargonja et al. ............ 340/988 |
| 2007/0262144 A1* | 11/2007 | Cargonja et al. ............ 235/451 |
| 2008/0001783 A1* | 1/2008 | Cargonja et al. ............ 340/988 |

OTHER PUBLICATIONS

Office Action mailed Jan. 16, 2008 in U.S. Appl. No. 11/328,728, filed Jan. 10, 2006.

Office Action mailed Jan. 24, 2008 in U.S. Appl. No. 11/329,411, filed Jan. 10, 2006.

Office Action mailed May 29, 2008 in U.S. Appl. No. 11/329,379, filed Jan. 10, 2006.

Office Action mailed Jul. 25, 2008 in U.S. Appl. No. 11/328,728, filed Jan. 10, 2006.

\* cited by examiner

Fig. 1

| 106 | 107 | 108 | 109 | 110 | 111 | 112 |
|---|---|---|---|---|---|---|
| PREAMBLE | SIGNPOST CODE | TIMING | ANTENNA SELECT | SUPPRESSION ON/OFF | ERROR CONTROL | PACKET END |

Fig. 2

| 121 | 122 | 123 | 124 | 125 | 126 | 127 | 128 | 129 | 130 | 131 | 132 |
|---|---|---|---|---|---|---|---|---|---|---|---|
| PREAMBLE | TAG TYPE | ASSET TYPE | TAG CODE | TIME INFORMATION | EVENT ID | SIGNPOST CODE | LOCATION INFORMATON | SEQUENCE A | SEQUENCE B | ERROR CONTROL | PACKET END |

LOCATION TABLE

| CODE | LOCATION | |
| --- | --- | --- |
| | FLOOR | DOOR |
| ⋮ | | |
| 364 | 2 | 1 |
| 471 | 2 | 1 |
| 536 | 2 | 1 |
| 558 | 1 | 1 |
| 672 | 1 | 1 |
| 714 | 1 | 2 |
| 788 | 2 | 2 |
| 948 | 2 | 1 |
| ⋮ | | |

*Fig. 5* ↙64

REPLACEMENT/ACTIVE TABLE

| CODE | ACTIVE | REPLACEMENT |
| --- | --- | --- |
| ⋮ | | |
| 364 | 0 | 471 |
| 471 | 0 | — |
| 536 | 1 | 364 |
| 558 | 1 | — |
| 672 | 1 | — |
| 714 | 1 | — |
| 788 | 1 | — |
| 948 | 1 | — |
| ⋮ | | |

RADIO FREQUENCY IDENTIFICATION TAG AND A METHOD OF OPERATING SAME

FIELD OF THE INVENTION

This invention relates in general to tracking techniques and, more particularly, to techniques for tracking items or vehicles using radio frequency identification technology.

BACKGROUND

According to an existing technique for tracking items or vehicles, a device known as a radio frequency identification (RFID) tag is mounted on each item or vehicle. Signposts that transmit short-range signpost signals are provided near locations where tags will likely pass, for example near a door through which tags routinely travel. The tags can receive the signpost signals from nearby signposts, and can also transmit wireless tag signals that include information from the signpost. The tag signals typically have a an effective transmission range that is significantly longer than the effective transmission range of the signpost signals. Stationary devices commonly known as readers are provided to receive the tag signals. Existing systems of this type have been generally adequate for their intended purposes, but have not been satisfactory in all respects.

SUMMARY OF THE INVENTION

One of the broader forms of the invention involves: receiving in a receiver section of a tag wireless signpost signals that each include a signpost code; responding to receipt of a signpost signal by the receiver section by determining in a further section of the tag whether the signpost that generated the received signpost signal is currently active; and transmitting from a transmitter section of the tag wireless tag signals that each include a tag code associated with the tag, including responding to a determination by the further section that the signpost that generated the received signpost signal is currently active by causing the transmitter section to include in at least one tag signal an information portion that relates to the signpost that generated the received signpost signal, and responding to a determination by the further section that the signpost that generated the received signpost signal is currently inactive by excluding from the tag signals information relating to inactive signposts.

Another of the broader forms of the invention involves: receiving in a receiver section of a tag wireless signpost signals through at least one of first and second antennas of the tag; and responding to receipt of a signpost signal containing antenna select information for causing the receiver section to disable a selected one of the first and second antennas and to use the other of the first and second antennas to receive wireless signpost signals.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
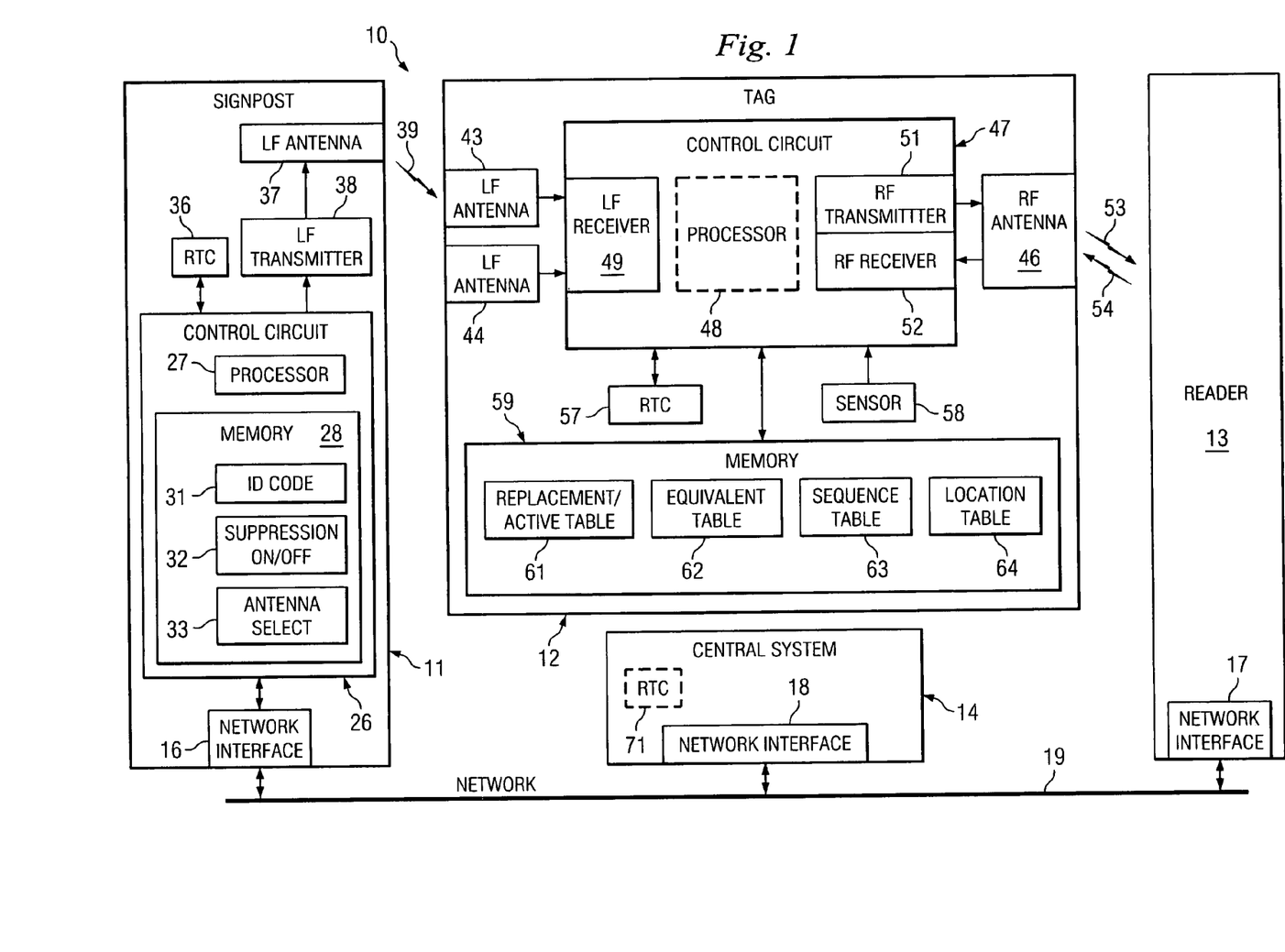
FIG. 1 is a block diagram showing an apparatus that embodies aspects of the present invention, and that includes a signpost, a beacon tag, a reader and a central control system.

FIG. 1 is a block diagram showing an apparatus 10 that embodies aspects of the present invention. The apparatus 10 includes a signpost 11, a beacon tag 12, a reader 13 and a central system 14. The apparatus 10 actually includes a number of signposts of the type shown at 11, a number of tags of the type shown at 12, and several readers of the type shown at 13. However, for clarity in explaining aspects of the present invention, FIG. 1 shows only one signpost 11, one tag 12 and one reader 13.

The signpost 11, reader 13 and central system 14 have respective network interfaces 16, 17, and 18 that are operatively coupled to a network 19. In the disclosed embodiment, the network 19 conforms to an industry standard commonly known as an Ethernet network. However, the network 19 could alternatively be any other suitable type of network, and could include wireless links. In the disclosed embodiment, the signpost 11, reader 13 and central system 14 are stationary, whereas the tag 12 is mobile. For example, the tag 12 may be supported on a vehicle, or on an item such as a shipping container. However, the invention encompasses alternative configurations in which the tag 12 is stationary, and one or more of the other components are mobile.

The signpost 11 includes a control circuit 26 that is operatively coupled to the network interface 16. The control circuit 26 may be a type of circuit commonly known as a microcontroller. The control circuit 26 includes a processor 27 and a memory 28. The memory 28 stores an identification code 31. In the embodiment of FIG. 1, each signpost 11 has a different identification code 31, such that each identification code 31 uniquely identifies a particular signpost. The identification code 31 does not change during normal operation of the system shown in FIG. 1. The memory 28 also stores suppression on/off information 32, and antenna select information 33, for purposes that are discussed in more detail later.

The signpost 11 includes a real-time clock (RTC) circuit 36 that is operatively coupled to the control circuit 26. The signpost 11 also includes a low frequency (LF) antenna 37, and an LF transmitter circuit 38 that is operatively coupled to the control circuit 26 and the antenna 37. The control circuit 26 can transmit LF wireless signpost signals 39 through the transmitter 38 and antenna 37. The transmitter 38 is a type of circuit known in the art, and is therefore not illustrated and described here in detail. The antenna 37 is a ferrite core and/or planar coil antenna of a known type. The antenna 37 is configured to transmit an omni-directional signal, but the antenna could alternatively be configured to transmit a signal that is to some extent directional.

The transmitter 38 generates the signpost signal 39 by effecting amplitude modulation of a carrier signal having a frequency within a range of approximately 30 KHz to 30 MHz. In the embodiment of FIG. 1, in order to facilitate compliance with governmental regulations of various different countries regarding electromagnetic emissions, the carrier frequency is selected to be 132 KHz. However, the carrier frequency could alternatively be some other frequency, such as 125 KHz or 13.56 MHz.

The transmitter 38 and the antenna 37 are configured so that the wireless signpost signals 39 are near-field signals of primarily magnetic character. As known to persons skilled in the art, a wireless signal with near-field characteristics has a roll-off that is roughly three times higher than the roll-off for a signal with far field characteristics. Consequently, the signpost signals 39 intentionally have a relatively short transmission range. This short transmission range can be adjusted to some extent. In the embodiment of FIG. 1, the transmission range is selected to be about 4 to 12 feet. Since the signpost signals 39 have near field characteristics, the transmission and reception of the signpost signals 39 may be viewed as fundamentally a magnetic coupling between two antennas, rather then a radio frequency (RF) coupling. The localized nature of the signpost signals 39 having near-field characteristics helps to facilitate compliance with governmental regulations, and also helps to minimize reception of these wireless signals by tags 12 that are beyond an intended transmission range of the signpost signals 39.

The wireless signpost signal 39 is typically transmitted in a relatively noisy environment. In order to ensure reliable signal detection by tags (such as the tag 12), known techniques are used to improve the signal-to-noise ratio (SNR). For example, in order to improve the SNR in the embodiment of FIG. 1, the amplitude modulation of the 132 KHz carrier is effected using the well-known technique of amplitude shift keying (ASK). It would alternatively be possible to use either frequency shift keying (FSK) or phase shift keying (PSK), in order to achieve an even higher SNR. However, use of FSK or PSK would typically require additional analog circuitry within each tag 12. Therefore, and since one object of the invention is to implement both the signpost 11 and the tag 12 at a low cost, ASK is used in the embodiment of FIG. 1.

Turning to the tag 12, two LF antennas 43 and 44 are oriented orthogonally with respect to each other. The tag 12 also includes an RF antenna 46. The RF antenna 46 is omni-directional, but it could alternatively be configured to be directional. The tag 12 has a control circuit 47 that includes a processor 48, an LF receiver 49 coupled to the LF antennas 43 and 44, an RF transmitter 51 coupled to the RF antenna 46, and an RF receiver 52 coupled to the RF antenna 46. The LF receiver 49 receives the wireless signpost signals 39 using one or both of the LF antennas 43 and 44. The receiver 49 is capable of detecting whether or not one or both of the antennas 43 and 44 are currently within the magnetic field generated by the antenna 37 of any signpost 11.

The reader 13 can transmit ultra high frequency (UHF) wireless signals 54, and the control circuit 47 of the tag 12 can receive these wireless signals 54 through the RF antenna 46 and the RF receiver 52. The control circuit 47 can transmit UHF wireless beacon or tag signals 53 using the RF transmitter 51 and the RF antenna 46. In the embodiment of FIG. 1, the wireless tag signals 53 are generated by using FSK modulation to superimpose selected information onto a carrier signal. The carrier signal has a frequency of 433.92 MHz, but it could alternatively have some other suitable frequency. One suitable alternative frequency is 915 MHz. Under current governmental regulations for transmission of electromagnetic signals, the frequency of 433.92 MHz is available for use in a larger number of countries then the frequency of 915 MHz. Consequently, the embodiment of FIG. 1 uses the frequency of 433.92 MHz.

The wireless tag signals 53 are transmitted using a technique that is known in the art as a slotted aloha protocol, in order to reduce interference between tag signals transmitted by the tag 12, similar tag signals transmitted by other tags, and the wireless signals 54 transmitted by the reader 13. The effective transmission range of the wireless signals 53 and 54 is significantly longer than the effective transmission range of the wireless signpost signals 39. In the embodiment of FIG. 1, the wireless signals 53 and 54 each have an effective transmission range of approximately 300 feet. In contrast, as mentioned above, the wireless signpost signals have an effective transmission range of about 4 to 12 feet.

The tag 12 has a memory 59. The memory 59 is operatively coupled to the control circuit 47, and stores a not-illustrated program that is executed by the processor 48. The memory 59 also stores four tables 61-64, for a purpose discussed in more detail later. In the embodiment of FIG. 1, the information in the tables 61-64 is periodically updated by the central system 14. In particular, the central system 14 provides update information for the tables to the reader 13, and the reader 13 then transmits this update information within wireless signals 54. When the tag 12 receives the wireless signals 54 containing the update information, the tag 12 updates the tables 61-64. Alternatively, the tables 61-64 could be updated by temporarily inserting the tag 12 into a not-illustrated docking station of a known type that is coupled to the central system 14, and that allows the central system 14 to communicate with the control circuit 47 in the tag 12.

The tag 12 includes an RTC circuit 57 that is operatively coupled to the control circuit 47, and includes a sensor 58 that is also operatively coupled to the control circuit 47. In FIG. 1, the sensor 58 measures temperature. However, it could alternatively measure or detect some other parameter, such as humidity, the integrity of a seal securing the door of a shipping container, or some other parameter.

The reader 13 is a device of a type generally known in the art. Therefore, the internal structure of the reader 13 is not shown and described here in detail, and the following discussion addresses primarily the unique characteristics of the reader 13 that relate to aspects of the invention. The reader 13 can transmit wireless signals at 54, and the control circuit 47 of tag 12 can receive the wireless signals 54 through the antenna 46 and the receiver 52. In the embodiment of FIG. 1, the wireless signals 54 are UHF signals that have a frequency of 433.92 MHz, with Manchester encoded FSK modulation at 27.7 KBPS.

The central system 14 is an arrangement of a type generally known in the art. Therefore, the internal structure of the central system 14 is not shown and described here in detail. Instead, the following discussion addresses primarily the unique characteristics of the central system 14 that relate to aspects of the invention. In addition to the network interface 18 that was mentioned above, the central system 14 has an RTC circuit 71 that accurately keeps track of time.

Figure 2:
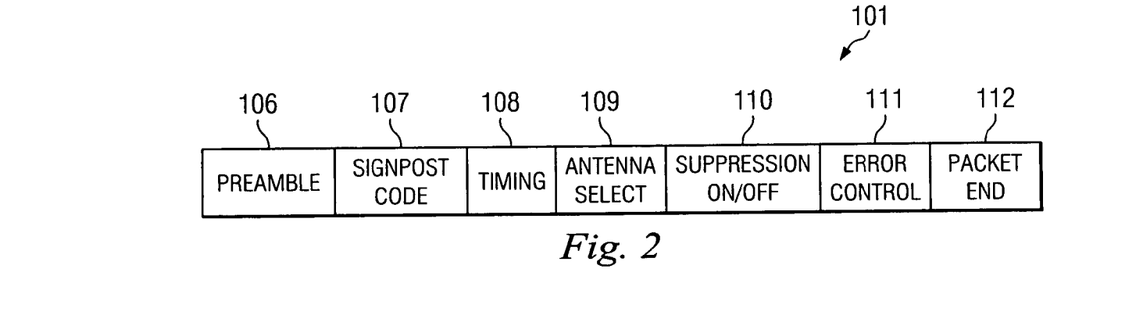
FIG. 2 is a diagrammatic view of a digital word that represents information transmitted by the signpost of FIG. 1 within a wireless signpost signal.

FIG. 2 is a diagrammatic view of a digital word 101 that represents information transmitted by the signpost 11 of FIG. 1 within its signpost signal 39. In more detail, with reference to FIGS. 1 and 2, the bits of the digital word 101 are incorporated into the signpost signal 39 by using amplitude modulation to serially modulate the bits of the word 101 onto the 132 KHz carrier. The bits of the word 101 are transmitted serially from left to right in FIG. 2. The digital word 101 includes several fields 106-112.

The first field is a preamble 106, and is a predefined pattern of bits that will allow a device receiving the wireless signpost signal 39 to recognize that the signpost signal is beginning, and to then synchronize itself to the signpost signal. The next field 107 in the word 101 is a signpost code, and in particular is the identification code 31 from the memory 28 of the signpost 11. As mentioned earlier, the system of FIG. 1 has a number of different signposts 11, only one of which is shown in FIG. 1. Since each signpost uses a different signpost code 107, the system can distinguish signpost signals transmitted by one signpost from signpost signals transmitted by other signposts.

The next field 108 in the digital word 101 contains timing information. In this regard, as explained above, the central system has an RTC 71 that maintains accurate time information. The central system 14 periodically sends timing information from its RTC 71 through the network 19 to the signpost 11, and the signpost 11 uses this timing information to update its own RTC 36, so that the RTC 36 is synchronized to the RTC 71 and thus is also very accurate. When the signpost 11 transmits its wireless signpost signal 39, it takes current timing information from its own RTC 36, and puts this timing information into the field 108 in the digital word 101. When the tag 12 receives the wireless signpost signal 39, it uses the timing information at 108 to update its own RTC 57. Thus, when the tag 12 is in the region of the signpost 11, the RTC 57 in the tag 12 will be closely synchronized with the RTC 36 in the signpost 11 and also with the RTC 71 in the central system 14, and thus will be very accurate.

As an alternative approach, timing information from the RTC 71 could in theory be supplied from the central system 14 to the reader 13, and could then be sent to the tag 12 within the wireless signals 54. However, communication between the tag 12 and reader 13 in the form of wireless signals 53 and 54 involves timing considerations. For example, after sending a wireless signal 54, the reader 13 may have to wait for a period of time before sending another wireless signal 54, in order to provide a time interval during which a number of tags 12 can transmit wireless signals 53 according to the slotted aloha protocol mentioned above. Suppressing transmission of the signals 54 during this time interval avoids having the signals 54 interfere with signals 53 transmitted by the tags. Consequently, the transmission of wireless signals 54 by the reader 13 can be sporadic, and it becomes problematic to achieve accurate and reliable delivery of timing information to the tags 12 through the RF wireless signals 54. In contrast, each signpost 11 can transmit its wireless signpost signals 53 on a relatively regular basis, and thus it is possible to achieve accurate and reliable delivery of timing information to the tags 12 using the LF wireless signpost signals 39.

The next field in the digital word 101 is an antenna select field 109. The signpost 11 inserts in this field the antenna select information stored at 33 in its memory 28. In the embodiment of FIG. 1, the antenna select information 33 indicates that antenna select capability is either enabled or disabled. Thus, for example, the antenna select information could be a single binary bit that is a binary "1" when the antenna select capability is enabled, and a binary "0" when the antenna select capability is disabled.

When the tag 12 receives the signpost signal 39, the tag 12 looks at the antenna select field 109 to see if the antenna select capability is enabled or disabled. If the field 109 indicates that the antenna select capability is enabled, then the tag 12 uses the LF receiver 49 to determine which of the LF antennas 43 and 44 is currently producing a stronger signal in response to the magnetic field generated by a nearby signpost 11. The control circuit 47 then disables the other of the antennas 43 and 44, or in other words the antenna that is producing the weaker signal. The tag 12 then continues operating with only one of the antennas 43 and 44, until it receives a further wireless signpost signal 39 in which the field 109 indicates that the antenna select capability is to be disabled. Upon receiving a signpost signal 39 in which the field 109 indicates antenna select capability is to be disabled, the tag 12 resumes using both of the antennas 43 and 44. Further, if the tag 12 is using one antenna but detects that it is no longer within a magnetic field generated by any signpost, the tag 12 would resume using both antennas 43 and 44.

As an alternative approach, the antenna select information at 33 could identify a specific one of the antennas 43 and 44 that is to be disabled. The tag 12 would respond to receipt of a wireless signal 39 with this antenna select information by disabling the specific antenna identified in the field 109. The tag 12 would then continue operating with only one antenna, until it received a signpost signal 39 selecting the other antenna, or a signpost signal indicating that both antennas should be used. Further, if the tag 12 was using only one antenna but detected that it was no longer within a magnetic field generated by any signpost, the tag 12 would resume using both antennas 43 and 44.

The next field in the digital word 101 is a suppression on/off control field 110. The signpost 11 inserts into this field the suppression on/off information stored at 32 in its memory 28. When the tag 12 receives a signpost signal 39, it will normally proceed to transmit a wireless tag signal 53 that contains the signpost identification code 107 from that received signpost signal. But if the received signpost signal contains a suppression on/off field 110 that indicates suppression is enabled, the tag 12 will suppress transmission of wireless tag signals 53, until it receives a further wireless signpost 39 with a suppression on/off field 110 indicating that the tag 12 is to disable transmission suppression and resume transmission of tag signals. In addition, if the tag 12 is suppressing transmissions but detects that it is no longer within a magnetic field generated by any signpost, the tag 12 would re-enable transmission of tag signals 54 (but might not actually transmit a tag signal 54 until it encounters another signpost, or until some other event occurs).

The next field in the digital word 101 is an error control field 111. In this regard, communications between the signpost 11 and other devices are essentially one-way transmissions. Further, many applications for the apparatus 10 of FIG. 1 involve environments that have relatively high noise levels. Consequently, it is important for a receiving device to be able to evaluate whether the digital word 101 in a received signpost signal is correct, or whether the word has errors. The error control field 111 is therefore provided in order to permit a degree of forward error correction (FEC). In the disclosed embodiment, the error control field 111 contains several parity bits, but it would alternatively be possible to use some other type of error control technique.

The last field in the word 101 is a packet end field 112. This field indicates to a receiving device (such as the tag 12) that the transmission of the signpost signal 39 is ending. In the embodiment of FIG. 1, the packet end field 112 contains several bits that are each a binary "0".

Figure 3:
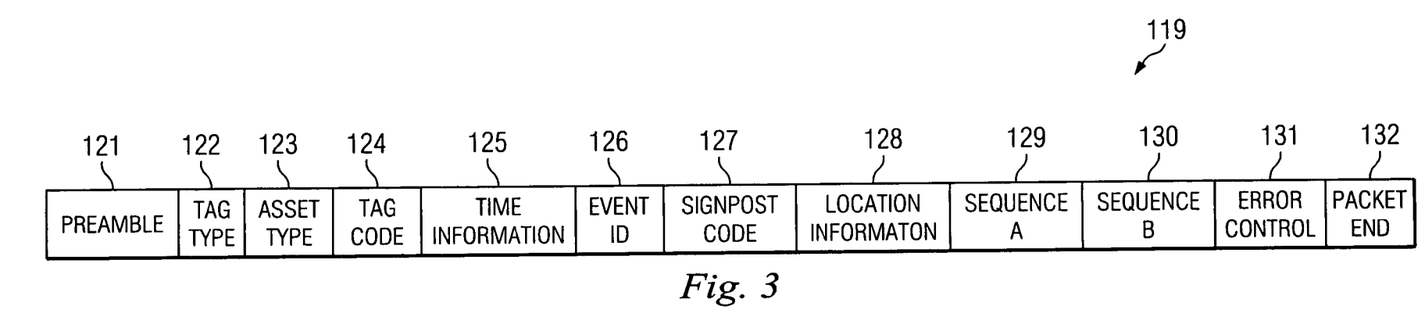
FIG. 3 is a diagrammatic view of a digital word that represents information transmitted by the tag of FIG. 1 within a wireless tag signal.

FIG. 3 is a diagrammatic view of a digital word 119 that represents information transmitted by the tag 12 of FIG. 1 within its tag signal 53. In particular, the bits of the digital word 119 are serially modulated onto the carrier signal. The bits of the word 119 are transmitted serially from left to right in FIG. 3.

With reference to FIGS. 1 and 3, the word 119 begins with a field that contains a preamble 121. The preamble 121 is functionally comparable to the preamble 106 in the word 101 of FIG. 2. The next field in the word 119 is a tag type field 122. As mentioned earlier, the apparatus of FIG. 1 can include a number of tags, and this group of tags can include various different types of tags. The tag type field 122 identifies the particular type of tag that transmitted the wireless tag signal 53 containing the word 119. The next field in the word 119 is an asset type field 123, and indicates the type of asset to which the tag 12 is currently attached. For example, the field 123 would contain one code if the tag was attached to one type of vehicle, would contain a different code if the tag was attached to a different type of vehicle, would contain yet another code if the tag was attached to a particular type of shipping container, and so forth.

The next field 125 in the word 119 contains time information from the RTC 57 of the tag 12, identifying the particular point in time at which an event occurred. As one example, and as discussed above, the receiver 49 of the tag 12 is capable of detecting whether or not the tag 12 is currently within the magnetic field generated by a signpost 11. When the control circuit 47 first detects that the tag 12 has entered the magnetic field of a signpost 11, that can be considered to be the occurrence of an event, and the tag 12 can transmit one or more tag signals 53 containing a word 119 in which the time information field 125 indicates the precise time at which the event occurred. As a different example, when the sensor 58 of the tag 12 first detects some specific condition, for example that an ambient temperature is outside a specified range of acceptable temperatures, that could be treated as an event causing the tag 12 to transmit one or more tag signals 53 in which the field 125 contains the time of the event. The next field 126 in the word 119 is an event identification field, and contains a code identifying the particular event that corresponds to the time information present in the time information field 125.

In theory, when the tag 12 detects an event, it could promptly transmit a tag signal 53 identifying the event in the field 126, but without any time information field 125. The central system 14 could then associate the event identification code 126 with the point in time at which the reader 13 received the tag signal 53. But as practical matter, as discussed above, it is often not possible to effect immediate transmission of a tag signal 53 to the reader 13, for example due to the fact that the tag 12 must transmit tag signals 53 according to a timing protocol such as the slotted aloha protocol. And even when the tag 12 does transmit the signal 53, if the ambient environment is noisy (for example because many tags are all transmitting), the tag 12 may have to transmit the tag signal 53 several times before that signal is accurately received by the reader 13. Consequently, the reader 13 and the central system 14 will learn of the occurrence of the event with a variable and unpredictable amount of time delay after the actual occurrence of the event. But in the embodiment of FIG. 1, as discussed above, the RTC 57 in the tag 12 is kept accurately synchronized with the RTC 71 in the central system 14, by sending timing information from the central system 14 through the network 19 to the signpost 11, and then from the signpost 11 through wireless signals 39 to the tag 12. Therefore, the tag 12 can very accurately identify exactly when an event occurs, and can identify that point in time in the time information field 125. Thus, even though there can be a variable and unpredictable amount of delay before the reader 13 receives a tag signal 53 relating to the event, the reader 13 and central system 14 will receive a highly accurate indication of the precise point in time at which that particular event occurred.

The next field in the digital word 119 is a signpost identification code field 127. This field contains the signpost identification code 107 (FIG. 2) from the wireless signpost signal 39 that was most recently received by the tag 12. The next field 128 in the word 119 contains location information. This location information is an indication of the physical location of the signpost that generated the wireless signpost signal 39 most recently received by the tag 12. The location information 128 will be discussed in more detail later. In some applications, it is possible to optionally omit the signpost code 127 from the word 119, such that the reader 13 receives the location information in the field 128, without any corresponding signpost identification code.

The next two fields 129 and 130 in the word 119 contain sequence information. In the embodiment of FIG. 1, the field 127 contains the most recently received signpost code, the field 129 contains a different signpost code most recently received before the signpost code in field 127, and the field 130 contains yet another signpost code most recently received before the signpost code in field 129. Thus, by examining fields 127, 129 and 130 in a received word 119, the central system 14 can identify the three signposts that were most recently encountered by the tag 12, as well as the sequence in which those three signposts were encountered, so as to ascertain the approximate path of travel of the tag 12, and the tag's direction of movement along that path of travel.

In an alternative configuration, the sequence information in the fields 129 and 130 can be location information. For example, the field 128 contains location information for the most recently encountered signpost, the field 129 would contain location information for a different signpost encountered most recently before the signpost associated with field 128, and the field 130 would contain location information for still another signpost encountered most recently before the signpost associated with field 129.

The next field in the word 119 is an error control field 131. In the disclosed embodiment, this field contains a cyclic redundancy code (CRC) of a known type, which is calculated using the information in fields 122-130. The error control field 131 gives the reader 13 a degree of capability to detect and correct some errors in a received word 119. The last field in the word 119 is a packet end field 132. This field signals to the reader 13 that the transmission of signal 53 is ending. In the disclosed embodiment, the packet end field 132 contains several binary bits that are each a binary "0".

The invention is not limited to the particular word formats 101 and 119 shown in FIGS. 2 and 3. The words 101 and 119 could each have other fields in addition to the fields described above and shown in FIGS. 2 and 3. Similarly, for certain applications, some of the fields shown in FIGS. 2 and 3 could optionally be omitted from one or both of the words 101 and 119.

Figure 4:
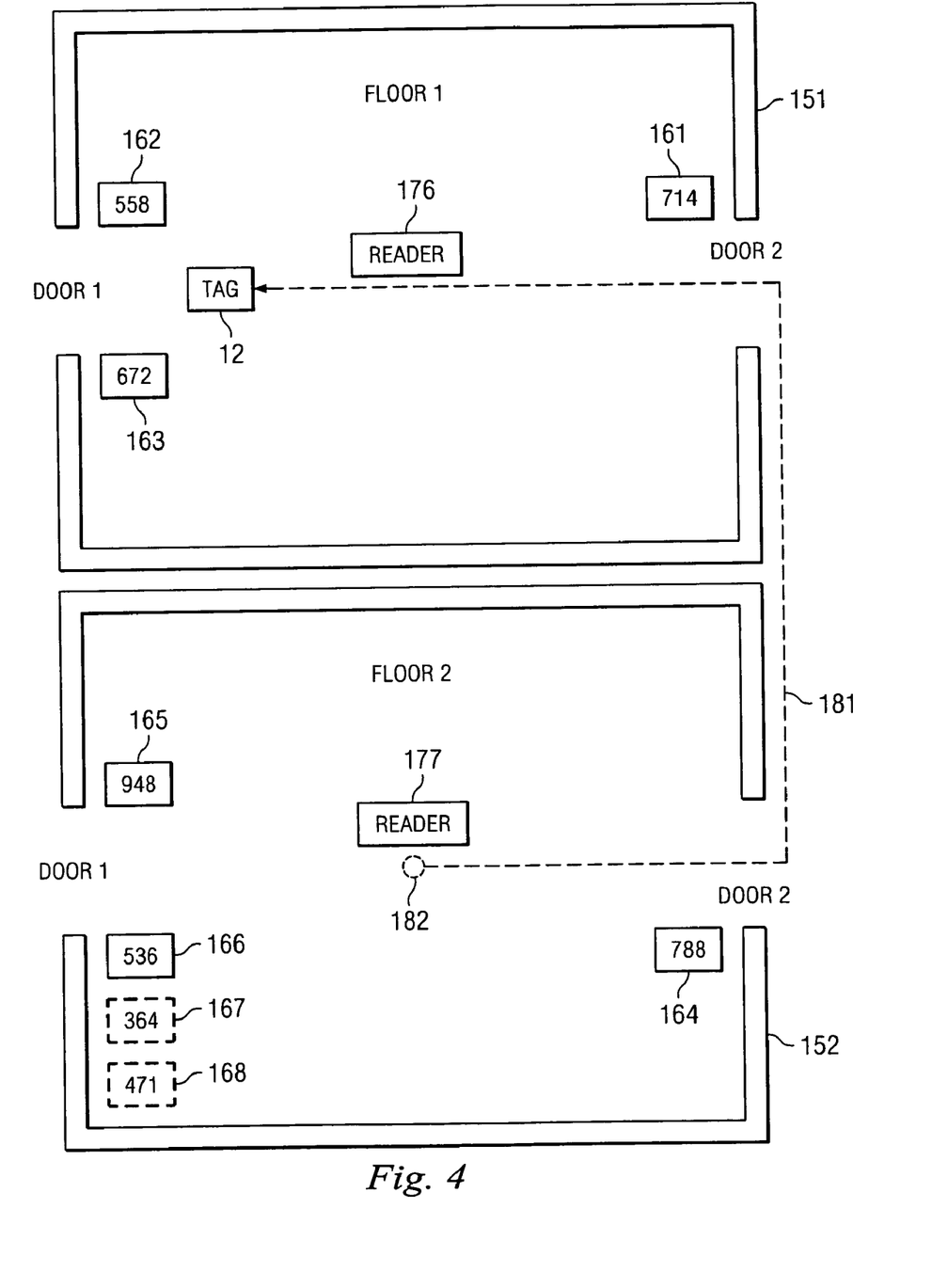
FIG. 4 is a diagrammatic top view showing one possible application for the apparatus of FIG. 1.

FIG. 4 is a diagrammatic top view showing a hypothetical application of an apparatus of the type shown in FIG. 1, in order to help convey a clear understanding of certain aspects of the present invention. FIG. 4 shows two rooms 151 and 152 from the same building, and these rooms are respectively referred to as FLOOR 1 and FLOOR 2. Each of the rooms 151 and 152 has two doors that are respectively identified as DOOR 1 and DOOR 2. It will be noted that DOOR 1 of each room is approximately twice as wide as DOOR 2 thereof. The two rooms could be located in different stories of the building, for example with FLOOR 2 located directly over FLOOR 1, and with DOOR 2 of each room being a respective entrance to a common elevator. Alternatively, the two rooms could be on the same story of the building, with a hallway extending from DOOR 2 of FLOOR 1 to DOOR 2 of FLOOR 2.

FIG. 4 shows six signposts 161-166 that are distributed within FLOOR 1 and FLOOR 2. Each of the signposts 161-166 is effectively equivalent to the signpost shown at 11 in FIG. 1, except that the signposts 161-166 each have a unique identification code 31. In FIG. 4, the number shown inside each signpost 161-166 represents its respective identification code 31. In other words, the respective identification codes for the six signposts 161-166 are "714", "558", "672", "788", "948" and "536". The signpost 161 is stationarily positioned near DOOR 2 of FLOOR 1, and the signposts 162 and 163 are stationarily positioned on opposite sides of DOOR 1 of FLOOR 1. Similarly, the signpost 164 is stationarily positioned near DOOR 2 of FLOOR 2, and the signposts 165 and 166 are stationarily positioned on opposite sides of DOOR 1 of FLOOR 2.

Two additional signposts 167 and 168 are shown in broken lines near the signpost 166. The signposts 167 and 168 are shown in broken lines because they are no longer present in FLOOR 2, but in the past they were each present at the location where signpost 166 is now installed. In particular, signpost 168 was originally present at this location, and was then removed and replaced with the signpost 167. Later, the signpost 167 was removed and replaced with the signpost 166. As mentioned above, DOOR 1 is wider than DOOR 2 for each of FLOOR 1 and FLOOR 2. As also discussed above, the signposts 161-166 each transmit a signpost signal having an effective range of about 4 to 12 feet. If each DOOR 1 is wider than about 10 to 12 feet, then a single signpost provided on one side of that door would not be able to transmit a signpost signal far enough to reliably cover the entire width of the door opening. Consequently, DOOR 1 of FLOOR 1 has two signposts 162 and 163 that are located on opposite sides thereof, and DOOR 1 of FLOOR 2 also has two signposts 165 and 166 that are located on opposite sides thereof. Each of these signposts can transmit a signpost signal far enough to cover at least half of the width of the adjacent door opening. Consequently, a tag passing through either of these doors will necessarily receive a signpost signal from at least one of the two signposts at that door.

FIG. 4 shows two readers 176 and 177 that are each equivalent to the reader shown at 13 in FIG. 1. The reader 176 is stationarily installed in approximately the center of FLOOR 1, for example on the ceiling. Similarly, the reader 177 is stationarily installed in approximately the center of FLOOR 2.

FIG. 4 also shows the tag 12 of FIG. 1. Typically, a number of tags would be present within FLOOR 1 and FLOOR 2. However, for clarity in explaining certain aspects of the invention, FIG. 4 shows only a single tag 12. The tag 12 can move with respect to the other components depicted in FIG. 4. For example, the tag 12 may be mounted on a forklift or other vehicle, or may be mounted on an object such as a shipping container that is moved around. Tag 12 can move within FLOOR 1 and within FLOOR 2, and can also move from FLOOR 1 to FLOOR 2 and from FLOOR 2 to FLOOR 1. The broken line 181 in FIG. 4 represent a hypothetical path of travel recently followed by the tag 12. This path of travel 181 begins at a location 182 disposed approximately at the center of FLOOR 2, then passes through DOOR 2 of FLOOR 2 and thus past tag 164, then passes through DOOR 2 of FLOOR 1 and thus past tag 161, and then extends to a location near DOOR 1 of FLOOR 1, between the tags 162 and 163. For the sake of discussion, it is assumed that, as the tag 12 approaches DOOR 1 of FLOOR 1, it happens to receive a signpost signal from the tag 163 before it receives a signpost signal from the tag 162.

Figure 5:
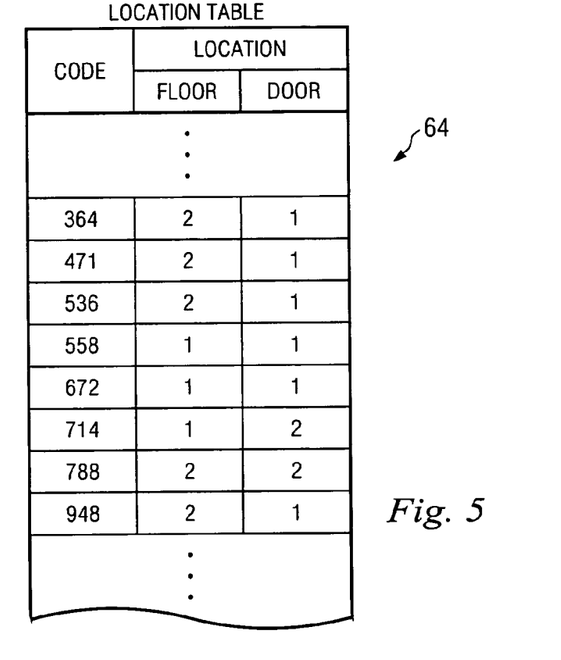
FIG. 5 shows an example of a location table that is stored within the tag of FIG. 1.

As discussed above in association with FIG. 1, the tag 12 has a memory 59 that stores four tables 61-64. Hypothetical examples of these tables are shown in FIGS. 5-8, and in particular depict information corresponding to the hypothetical situation shown in FIG. 4. In more detail, FIG. 5 shows an example of the location table 64. Each of the visible rows in this table corresponds to a respective different signpost. The left field in each row contains the unique identification code of a particular signpost. Thus, from top to bottom, the eight rows visible in FIG. 5 respectively correspond to the signposts 167, 168, 166, 162, 163, 161, 164 and 165 in FIG. 4. The middle and right fields of each row provide location information for the associated signpost. In particular, the middle field identifies whether the signpost is located on FLOOR 1 or FLOOR 2, and the right field identifies whether the signpost is disposed by DOOR 1 or DOOR 2 of the floor identified in the middle field. It will be noted that the hypothetical location information given in FIG. 5 for each signpost corresponds directly to the location of the corresponding signpost in the exemplary scenario depicted in FIG. 4.

Figure 6:
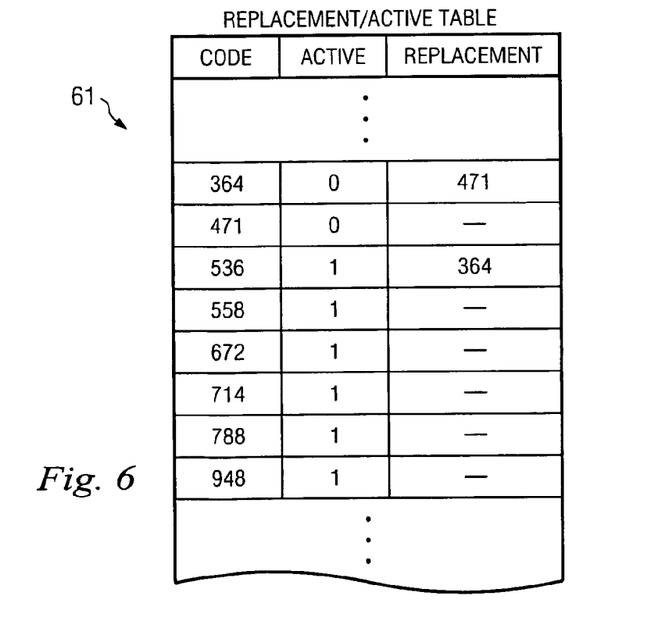
FIG. 6 shows an example of a replacement/active table that is stored within the tag of FIG. 1.

FIG. 6 is a diagrammatic view of the replacement/active table 61. Each of the visible rows in table 61 corresponds to a respective one of the signposts 161-168 in FIG. 4, where the left field in each row contains the unique identification code for the signpost. The middle field in each row is a binary bit that is set to a binary "1" if a signpost is currently active, or to a binary "0" if the signpost is currently inactive. Thus, for example, since the signposts 167 and 168 (having respective identification codes of "364" and "471") have each been previously removed from the scenario shown in FIG. 4, they are each identified in FIG. 6 as currently being inactive. In contrast, the other six signposts of FIG. 4 are indicated to be active in FIG. 6. Although the active/inactive information for the signposts is located in the middle column of table 61 in FIG. 6, it would alternatively be possible for table 64 of FIG. 5 to have an additional column that contains this active/inactive information.

The right field in each row of table 61 contains an identification of a replaced signpost (if any). More specifically, if a given signpost replaced another signpost, then the right field of the row for the replacement signpost contains the identification code of the replaced signpost. Thus, for example, the first visible row in table 61 corresponds to signpost 167 (which has identification code "364"), and the right field contains identification code "471" in order to indicate that signpost 167 replaced signpost 168 (which has identification code "471"). In a similar manner, the third visible row of table 61 indicates that signpost 166 (having identification code "536") replaced signpost 167 (having identification code "364").

Figure 7:
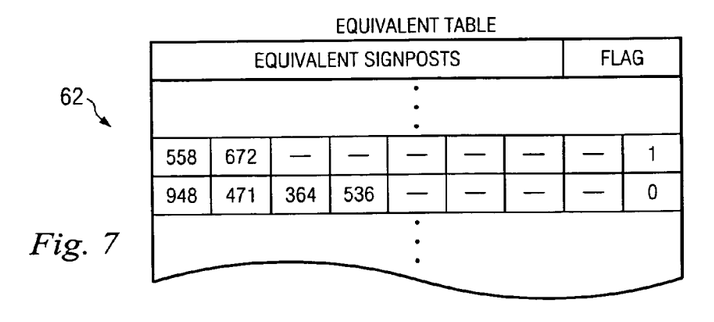
FIG. 7 shows an example of an equivalent table that is stored within the tag of FIG. 1.

FIG. 7 is a diagrammatic view of the equivalent table 62. Each row of this table identifies two or more signposts that, in the hypothetical situation shown in FIG. 4, are effectively equivalent. For example, the two signposts 162 and 163 in FIG. 4 are provided are opposite sides of DOOR 1 of FLOOR 1, and are functionally equivalent. These signposts transmit wireless signals with respective identification codes "558" and "672". Either of these identification codes will tell the tag 12 the same thing, or in other words that the tag is in the vicinity of DOOR 1 of FLOOR 1. Consequently, the upper row visible in FIG. 7 contains the identification codes "558" and "672" for these two signposts, in order to indicate that these signposts are effectively equivalent. The lower row visible shown in FIG. 7 corresponds to DOOR 1 of FLOOR 2, where signpost 165 is effectively equivalent to signpost 166, as well as the replaced signposts 167 and 168. That row of table 62 therefore includes the identification codes for all four of the signposts 165-168.

In table 62 in FIG. 7, the rightmost field in every row is a one-bit flag. The tag 12 sets the flag bit in a given row the first time that the tag receives a signpost signal from any of the signposts identified in that row, and the tag thereafter ignores signpost signals from any of the signposts identified in that particular row. For example, the tag 12 in FIG. 4 is approaching DOOR 1 of FLOOR 1, and receives a signpost signal from the signpost 163 before it receives a signpost signal from the signpost 162. In other words, the first signpost signal received from either of the signposts 162 and 163 is from the signpost 163, and contains identification code "672". The tag 12 locates the row in table 62 that contains identification code "672", and sets the flag bit in the right field of this row, as shown in FIG. 7. The tag 12 is likely to subsequently receive signpost signals from each of the signposts 162 and 163 as the tag 12 passes through DOOR 1 of FLOOR 1. But each time it receives such a signpost signal, it will find that the signpost code ("672" or "558") is in a row of table 62 where the flag bit is set. The tag 12 will therefore ignore each of these additional signpost signals, because they are all effectively redundant to the initial signpost signal that caused the tag to set the flag bit.

As discussed above, the tag 12 can detect whether it is currently within the magnetic field produced by any signpost. As soon as the tag 12 detects that it is no longer within the magnetic field of any signpost, it will reset all flag bits that have been set within table 62. Thus, in the hypothetical scenario of FIG. 4, after the tag 12 has passed through DOOR 1 of FLOOR 1 and has moved out of the transmission ranges of the signposts 162 and 163, the tag will not be detecting the magnetic field of any signpost, and will reset any and all flag bits that had been set in table 62.

Figures 8, 9:
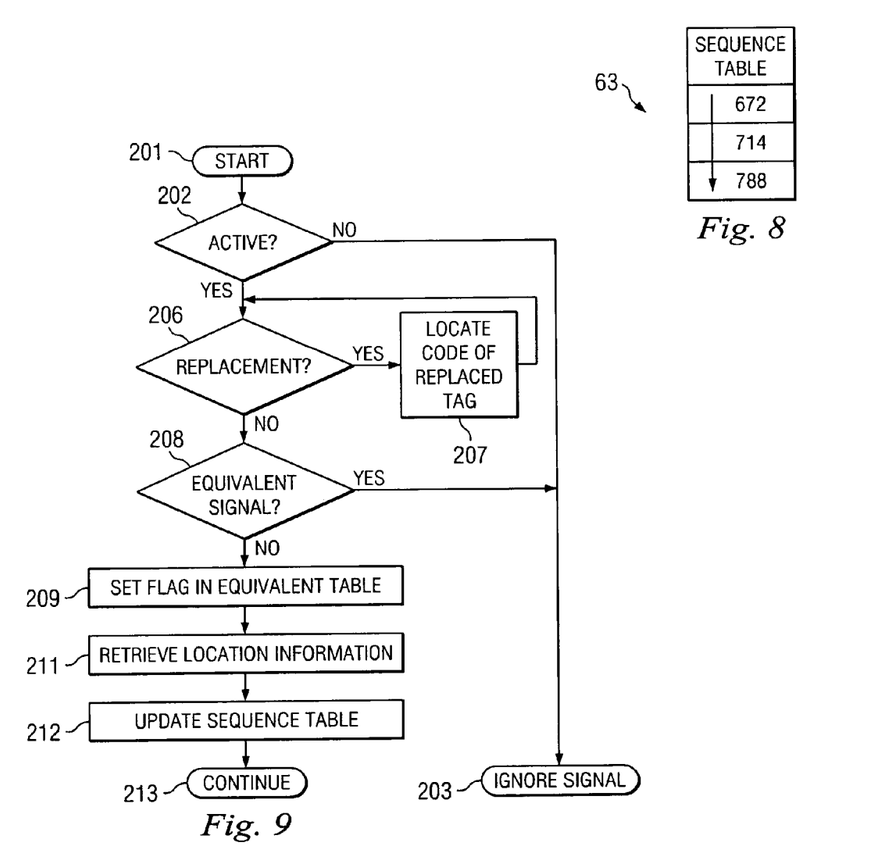
FIG. 8 shows an example of a sequence table that is stored within the tag of FIG. 1.
FIG. 9 is a flowchart showing how the tag of FIG. 1 utilizes the tables of FIGS. 5-8 when the tag receives a signpost signal.

FIG. 8 is a diagrammatic view of the sequence table 63. The sequence table 63 has three rows, and each row has one field that contains a single signpost identification code. Each time the tag 12 receives a signpost signal with an identification code that is different from the identification. code in the top row of table 63, and that is not identified as an equivalent in table 62 (FIG. 7), the tag 12 discards the identification code in the bottom row of table 63, moves each of the other two identification codes down one row, and inserts the newly-received identification code in the top row. Consequently, the table 63 always identifies, in sequence, the three signposts most recently encountered by the tag 12 (excluding any equivalent signposts that the tag encountered). With reference to the exemplary path of movement indicated at 181 in FIG. 4, the tag 12 passed the signpost 164 (having identification code "788"), then passed the signpost 161 (having identification code "714"), then encountered the signpost 163 (having identification code "672"). Consequently, the sequence table 63 in FIG. 8 shows the identification codes of these three signposts, arranged in the sequence in which the tag 12 encountered those signposts.

In the embodiment of FIG. 1, the sequence table 63 of FIG. 8 contains the identification codes of signposts that the tag 12 has passed. Alternatively, however, the sequence table 63 could contain location information from the table 64 (FIG. 5) for each signpost that the tag 12 has passed, such as the location information shown in the two right fields of each row in table 64 of FIG. 5.

FIG. 9 is a flowchart showing how the tag 12 utilizes the four tables shown in FIGS. 5-8 when the tag receives a signpost signal. In particular, in response to receipt of a signpost signal, the tag 12 begins at block 201, and proceeds to block 202. In block 202, the tag uses the identification code from the received signpost signal to locate the row in table 61 (FIG. 6) that corresponds to the associated signpost, and then the tag checks that row to see if that signpost is currently active. If the signpost is not currently active, then its signpost signal is irrelevant and should be ignored, and the tag 12 exits the flowchart of FIG. 9 at block 203.

In contrast, if the tag determines at block 202 that the signpost in question is active, then control proceeds from block 202 to block 206, where the tag 12 checks table 61 to see if the signpost it has identified is a signpost that replaced some other signpost. If so, then control proceeds to block 207, where the tag 12 retrieves from table 61 the identification code of the replaced signpost, and shifts its focus to that replaced signpost. In particular, control returns to block 206, where the tag checks to see if the replaced signpost was itself used to replace yet another signpost. When a determination is made at block 206 that the tag 12 has identified a signpost that did not replace another signpost, control proceeds. from block 206 to block 208.

As a practical example, and with reference to FIG. 4, assume that the tag 12 receives a signpost signal from signpost 166 (having identification code "536"). Using table 61, the tag 12 will determine that signpost 166 replaced signpost 167 (having identification code "364"). The tag will shift its focus to signpost 167, and will then determine that signpost 167 replaced signpost 168 (having identification code "471"). The tag 12 will then shift its focus to signpost 168, and will find that signpost 168 did not replace any other signpost. Accordingly, the tag will proceed from block 206 to block 208, and will carry out further processing in the flowchart of FIG. 9 using information relating to the original signpost 168, and will effectively ignore the two replacement signposts 166 or 167. Stated differently, even though the tag 12 actually received a signpost signal from the signpost 166, the tag will end up treating the signpost signal as though it was received from the signpost 168 (which is no longer actually present or active in the scenario of FIG. 4).

In block 208, the tag 12 checks to see whether the received signpost signal is equivalent to some other signpost signal that the tag has already received. More specifically, the tag 12 locates the appropriate identification code in equivalent table 62, and checks the right field of that row in order to see if the flag bit is set. If so, then the received signpost signal can be ignored, and control proceeds to block 203, where the tag exits the flowchart of FIG. 9. It should be noted that, if the received signpost signal came from a signpost that has replaced another signpost, then pursuant to blocks 206 and 207 in FIG. 9, the tag 12 will check the table 62 using the identification code of the replaced signpost. Thus, in the hypothetical scenario of FIG. 4, if the received signal was from the signpost 166, the tag 12 would have identified the replaced original signpost 168, and would be checking table 62 for the identification code "471" of the replaced signpost 168.

If the tag 12 determines in block 208 that the flag in the right field of the appropriate row in table 62 has not been set, then control proceeds from block 208 to 209, where the tag 12 sets that particular flag in the table 62. Control then proceeds from block 209 to block 211.

In block 211, the tag 12 searches table 64 (FIG. 5) for the relevant signpost identification code, and then retrieves the location information associated with that identification code. Control then proceeds to block 212, where the tag 12 updates the sequence table 63 shown in FIG. 8. More specifically, as discussed above, the tag 12 discards the information in the bottom row, moves each of the other two items of information down one row, and then inserts new information in the top row. If the tag 12 is maintaining sequence information in the form of signpost identification codes, then the new signpost identification code is inserted in the top row. Alternatively, if the tag 12 is maintaining sequence information in the form of location information, then the location information retrieved at block 211 is inserted in the top row of table 63.

From block 212, control proceeds to block 213, where the tag 12 exits the flowchart of FIG. 9, and continues other processing related to the received signpost signal. For example, as part of this additional processing, the tag 12 will transmit a tag signal 53 (FIG. 1) that contains the information shown in the digital word 119 of FIG. 3. The location information in field 128 will be the location information retrieved at block 211 in FIG. 9, and the sequence information in fields 129 and 130 will be the information from the lower two rows in the sequence table 63 of FIG. 8. The information from the top row of the sequence table 63 will inherently appear in either field 127 or field 128, depending on whether the sequence table 63 contains signpost identification codes or signpost location information.

Figure 10:
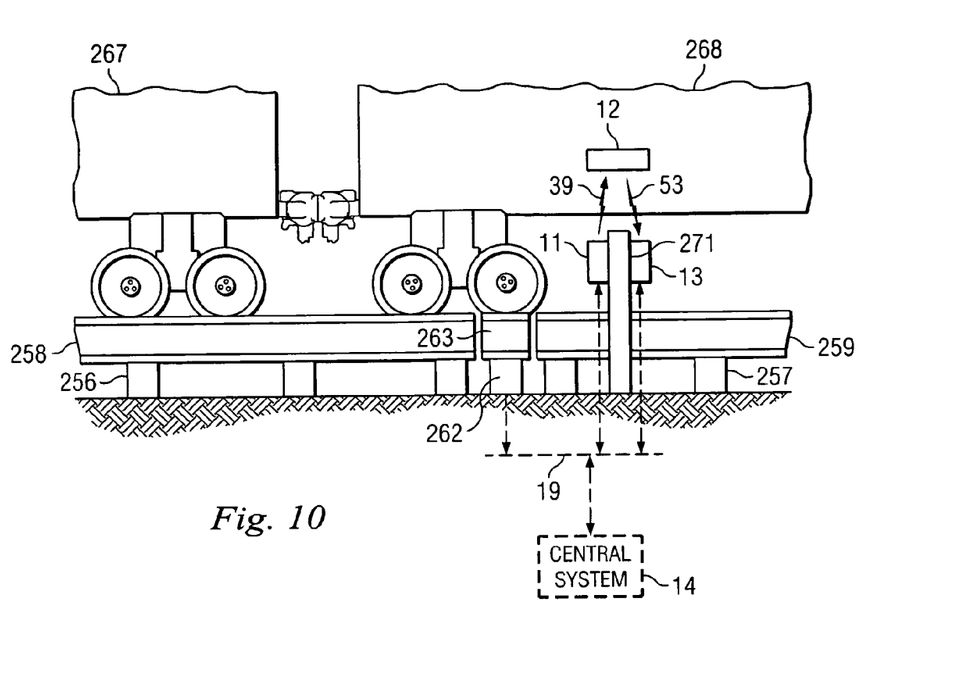
FIG. 10 is a diagrammatic fragmentary view of a hypothetical scenario representing another possible application for the apparatus of FIG. 1.

FIG. 10 is a diagrammatic fragmentary view of a hypothetical scenario representing another possible application for the apparatus of FIG. 1. FIG. 10 shows a railway that includes a plurality of standard railroad ties, two of which are identified at 256 and 257. The railroad ties support standard rails, two of which are visible at 258 and 259. The adjacent ends of the ties 258 and 259 are spaced a short distance from each other, and a weight-activated switch 262 is provided in the region below the space between the rails 258 and 259. A short rail section 263 is supported on the switch 262. FIG. 10 also shows part of a train that is traveling along the railway, including two conventional railway cars 267 and 268 that are releasably coupled to each other by a known coupling mechanism. Each time that a wheel of a railway car passes over the short rail section 263, part of the weight of the railway car will be applied to the short rail section 263, and thus in turn to the switch 262, so as to actuate the switch 262.

A vertical post 271 is provided near the switch 262, and has its lower end fixedly anchored in the ground. The signpost 11 and the reader 13 of FIG. 1 are each mounted on the post 271. Each of the railway cars of the train has a tag 12 mounted thereon. As indicated diagrammatically by broken lines in FIG. 10, the signpost 11 and the reader 13 are each operatively coupled to the central system 14 through the network 19, as discussed above in association with FIG. 1. In addition, an output of the switch 262 is operatively coupled to the central system 14 through the network 19. As discussed above in association with FIGS. 1-3, timing information from the RTC 71 in the central system 14 is supplied to the signpost 11 through the network 19. When each tag 12 is close enough to the signpost 11 to receive the wireless signpost signals 39 transmitted by the signpost, the tag receives accurate timing information in the field 108 of the word 101 within the signpost signals.

As explained above, each time that a wheel on one of the railway cars passes over the rail section 263, the switch 262 is actuated. Since the central system 14 receives the output of the switch 262, The central system 14 can maintain an accurate count of the number of times that the switch 262 is actuated as the train passes by, and can determine from this the number of railcars that pass the switch 262. In addition, the tag 12 on each railcar will respond to the wireless signpost signals 39 from the signpost 11 by transmitting a wireless tag signal 53. The tag signal 53 contains information of the type discussed above in association with FIG. 3, including the unique identification code 124 of the tag 12, as well as the time information 125. When the reader 13 receives the tag signal 53, the reader 13 will take this information from the signal and forward it to the central system 14 through the network 19. Since the tag 12 has received accurate time information from the central system 14 through the signpost 11 and the wireless signals 39, the time information 125 that the tag 12 includes in the wireless signal 53 will be a very accurate indication of the point in time at which a specified event occurred. For example, in the embodiment of FIG. 10, this event occurs when the tag 12 first detects the magnetic field produced by the signpost 11.

In the embodiment of FIG. 1, the signpost identification code stored at 31 in the memory 28 of the signpost 11 is a predetermined code uniquely identifying that particular signpost. It may be preset when the signpost is manufactured. In an alternative embodiment, the signpost identification code stored at 31 is a programmable value that can be selectively set by the central system 14 through the network 19. Further, in a related variation of FIG. 4, equivalent signposts, such as the signposts 162 and 163, do not have different signpost codes. Instead, the central system 14 sets the signpost codes 31 within these two signposts to be identical. Similarly, the central system 14 sets the signpost codes 31 within the two equivalent signposts 165 and 166 to be identical, but different from the code in signposts 162-163.

When the tag 12 is near DOOR 1 of FLOOR 1, it will receive the same signpost code in any signpost signal, regardless of whether that signal comes from the signpost 162 or the signpost 163. Similarly, when the tag 12 is near DOOR 1 of FLOOR 2, it will receive the same signpost code in any signpost signal, regardless of whether that signal comes from the signpost 165 or the signpost 166. Once the tag 12 receives one signpost signal containing a given signpost code, it will ignore all other signpost signals it subsequently receives that contain the same code, until it receives a signpost signal with a different code. Consequently, in this modified embodiment, the tag 12 would not need to maintain the equivalent table 62 shown in FIG. 7.

Figure 11:
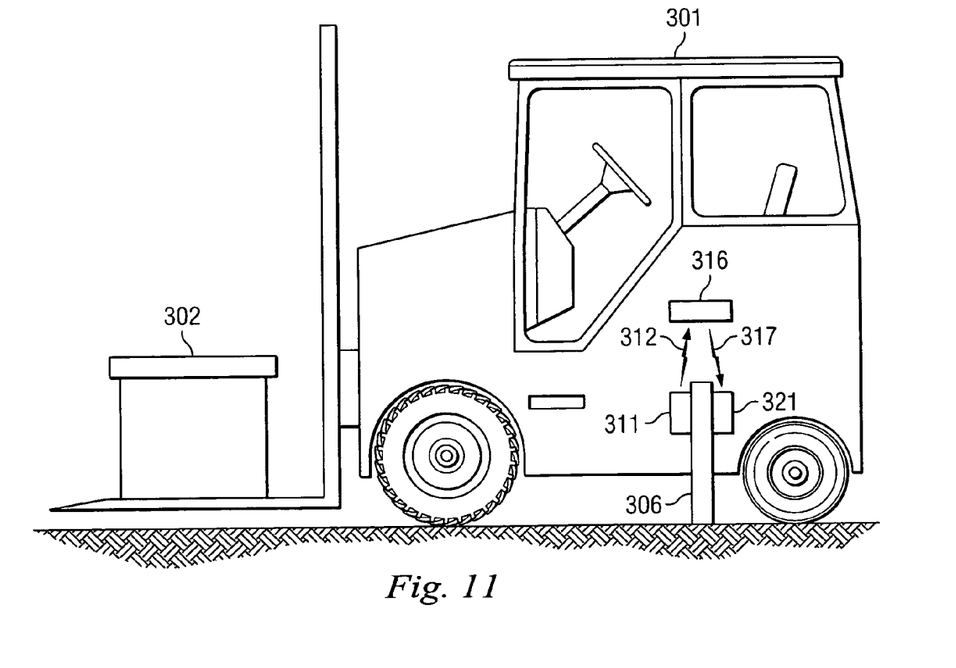
FIG. 11 is a diagrammatic view of a scenario that represents an application for an apparatus that is an alternative embodiment of the apparatus shown in FIG. 1.

FIG. 11 is a diagrammatic view of a scenario that represents an application for an alternative embodiment of the system shown in FIG. 1. In FIG. 11, a standard forklift 301 is carrying a container 302. A vertical post 306 is stationarily installed adjacent a path of travel of the forklift 301, and a signpost 311 is mounted on the post 306. The signpost 311 is generally similar to the signpost 11 discussed above in association with FIG. 1, except that wireless signpost signals 312 transmitted by the signpost 311 do not include a signpost identification code 107 (FIG. 2). A tag 316 is mounted on the forklift 301. The tag 316 is generally similar to the tag 12 discussed above in association with FIG. 1, except that wireless tag signals 317 transmitted by the tag 316 do not include a signpost identification code 127 (FIG. 3).

A reader 321 is mounted on the post 306. The reader 321 is generally similar to the reader 13 discussed above in association with FIG. 1, except that the reader 321 is configured to have a relatively short reception range for wireless tag signals 317. For example, an antenna and/or receiver circuit of the reader 321 may have a modified structure that serves to reduce the sensitivity of the reader 321 to wireless tag signals 317. In addition, or as an alternative, the tag 316 could have an antenna or transmitter circuit with a modified structure that reduces the effective transmission range of the wireless tag signals 317. The tag 316 and/or reader 321 are thus configured so that, in order for the reader 321 to reliably receive tag signals 317, the reader 321 must be within approximately 4 to 12 feet of the tag 316 that is transmitting the signals.

As discussed earlier, in order for the tag 316 to reliably receive the signpost signals 312 transmitted by the signpost 311, the tag 316 must be within approximately 4 to 12 feet of the signpost 311. Thus, the effective transmission range of the tag signals 317 is approximately the same as the effective transmission range of the signpost signals 312. In the arrangement of FIG. 11, when the tag 316 first receives a signpost signal 312 from the signpost 311, the tag 316 responds by transmitting at least one tag signal 317. When the reader 321 receives that tag signal 317, it forwards the information from the tag signal to the central system 14. The central system knows that the tag transmitted the received tag signal when the tag received a signpost signal 312 from the signpost 311, and that receipt of the signpost signal is only possible if the tag (and the associated railway car) are within 4 to 12 feet of the signpost 311. The central system also knows that, in order for the reader 321 to have received the tag signal, the tag that transmitted the tag signal must be within about 4 to 12 feet of the reader 321. Therefore, since the central system 14 knows the location of the signpost 311 and the reader 321, and also knows that the tag 316 is necessarily within 4 to 12 feet of each of the signpost 311 and reader 321, the central system 14 knows the location of the tag and thus the location of the railway car on which the tag is mounted, even though the tag signal 317 does not include a signpost code 127 that identifies the signpost 311.

Although selected embodiments have been illustrated and described in detail, it should be understood that a variety of substitutions and alterations are possible without departing from the spirit and scope of the present invention, as defined by the following claims.

What is claimed is:

1. An apparatus comprising a tag having circuitry that includes:
   a receiver section configured to receive wireless signpost signals that each include a signpost code;
   a further section responsive to receipt of a signpost signal by said receiver section for determining whether the signpost that generated the received signpost signal is currently active; and
   a transmitter section operable to transmit wireless tag signals that each include a tag code associated with said tag, said transmitter section responding to a determination by said further section that the signpost that generated the received signpost signal is currently active by including in at least one said tag signal an information portion that relates to the signpost that generated the received signpost signal, said transmitter section excluding from said tag signals information relating to signposts that are indicated to be inactive.

2. An apparatus according to claim 1, wherein said wireless signpost signals are near field signals of primarily magnetic character, said receiver section being configured to receive said signpost signals of magnetic character.

3. An apparatus according to claim 1, wherein said further section of said tag includes a memory storing a list of signpost codes, and storing an identification of whether each of the signpost codes in the list represents a signpost that has replaced a different signpost.

4. An apparatus according to claim 3, wherein said list is configured as a table.

5. An apparatus according to claim 1, further including:
   a signpost configured to transmit wireless signpost signals that each include a signpost code; and
   a reader configured to receive the wireless tag signals transmitted by said tag.

6. A method comprising:
   receiving in a receiver section of a tag wireless signpost signals that each include a signpost code;
   responding to receipt of a signpost signal by said receiver section by determining in a further section of said tag whether the signpost that generated the received signpost signal is currently active; and
   transmitting from a transmitter section of said tag wireless tag signals that each include a tag code associated with said tag, including responding to a determination by said further section that the signpost that generated the received signpost signal is currently active by causing said transmitter section to include in at least one said tag signal an information portion that relates to the signpost that generated the received signpost signal, and responding to a determination by said further section that the signpost that generated the received signpost signal is currently inactive by excluding from said tag signals information relating to inactive signposts.

7. A method according to claim 6, including:
   configuring said wireless signpost signals to be near field signals of primarily magnetic character; and
   configuring said receiver section to receive said signpost signals of magnetic character.

8. A method according to claim 6, including:
   storing a list of signpost codes in said further section of said tag; and
   storing an identification of whether each of the signpost codes in the list represents a signpost that has replaced a different signpost.

9. An apparatus comprising a tag having circuitry that includes a receiver section having first and second antennas and configured to receive wireless signpost signals through at least one of said antennas, said receiver section being responsive to receipt of a signpost signal containing antenna select information for causing a selected one of said first and second antennas to be disabled and the other of said first and second antennas to receive wireless signpost signals.

10. An apparatus according to claim 9, wherein said wireless signpost signals are near field signals of primarily magnetic character, said receiver section being configured to receive said signpost signals of magnetic character.

11. An apparatus according to claim 9, wherein said antenna select information identifies one of said first and second antennas.

12. An apparatus according to claim 9, wherein in response to said antenna select information said receiver section determines which of said first and second antennas is to be said selected antenna.

13. An apparatus according to claim 12, wherein said receiver section effects said determining of which of said antennas is to be said selected antenna by comparing the signal strengths currently being received by each of said antennas and then identifying as said selected antenna the one of said first and second antennas having the lowest received signal strength.

14. An apparatus according to claim 9, wherein said receiver section is responsive to a predetermined condition for re-enabling said selected antenna.

15. An apparatus according to claim 14,
   wherein said receiver section is configured to receive said signpost signals as near field signals of primarily magnetic character; and
   wherein said predetermined condition includes detection by said receiver section of an absence of a magnetic field.

16. An apparatus according to claim 9, wherein said first and second antennas are oriented to be orthogonal to each other.

17. An apparatus according to claim 9, further including a signpost configured to transmit wireless signpost signals that include antenna select information.

18. A method comprising:
receiving in a receiver section of a tag wireless signpost signals through at least one of first and second antennas of said tag; and
responding to receipt of a signpost signal containing antenna select information for causing said receiver section to disable a selected one of said first and second antennas and to use the other of said first and second antennas to receive wireless signpost signals.

19. A method according to claim 18, including:
configuring said wireless signpost signals to be near field signals of primarily magnetic character; and
configuring said receiver section to receive said signpost signals of magnetic character.

20. A method according to claim 18, including configuring said antenna select information to identify one of said first and second antennas.

21. A method according to claim 18, wherein said responding to receipt of said signpost signal containing said antenna select information includes determining in said receiver section which of said first and second antennas is to be said selected antenna.

22. A method according to claim 21, wherein said determining in said receiver section of which of said first and second antennas is to be said selected antenna includes comparing the signal strengths currently being received by each of said antennas and then identifying as said selected antenna the one of said first and second antennas having the lowest received signal strength.

23. A method according to claim 18, including responding to a predetermined condition by causing said receiver section to re-enable said selected antenna.

24. A method according to claim 23, including:
configuring said receiver section to receive said signpost signals as near field signals of primarily magnetic character; and
selecting as said predetermined condition the detection by said receiver section of an absence of a magnetic field.

25. A method according to claim 18, including orienting said first and second antennas to be orthogonal to each other.

* * * * *